(12) United States Patent
Orcutt

(10) Patent No.: US 11,272,378 B2
(45) Date of Patent: Mar. 8, 2022

(54) DEVICES, SYSTEMS AND PROCESSES FOR FACILITATING AD HOC COMMUNICATIONS IN DENSE AREAS

(71) Applicant: DISH Wireless L.L.C., Englewood, CO (US)

(72) Inventor: Jennings Maxwell Orcutt, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 11 days.

(21) Appl. No.: 16/863,923

(22) Filed: Apr. 30, 2020

(65) Prior Publication Data

US 2021/0345126 A1 Nov. 4, 2021

(51) Int. Cl.
*H04W 36/08* (2009.01)
*H04W 16/18* (2009.01)
*H04L 41/0806* (2022.01)
*H04W 84/18* (2009.01)

(52) U.S. Cl.
CPC ......... *H04W 16/18* (2013.01); *H04L 41/0806* (2013.01); *H04W 84/18* (2013.01)

(58) Field of Classification Search
CPC ......... G06Q 50/01; H04L 51/32; H04L 67/28; H04L 67/2809; H04L 65/403; H04L 67/306; H04L 47/70; H04L 29/08702; H04L 61/2528; G06F 21/6254; H04W 4/21; H04W 36/08; H04W 36/0061; H04W 36/30; H04W 84/06; B64C 39/024; B64C 2201/024; B64C 2201/108; B64C 2201/122; B64C 2201/027; H04B 7/18504; Y02D 30/70
See application file for complete search history.

(56) References Cited

U.S. PATENT DOCUMENTS

| | | | |
|---|---|---|---|
| 10,034,209 B1* | 7/2018 | Nandan | H04B 7/18504 |
| 2007/0010248 A1* | 1/2007 | Dravida | H04W 84/18 455/435.1 |
| 2012/0071174 A1* | 3/2012 | Bao | H04W 4/024 455/456.3 |
| 2013/0091209 A1* | 4/2013 | Bennett | G06Q 50/01 709/204 |
| 2013/0104221 A1* | 4/2013 | Low | H04W 8/186 726/9 |
| 2014/0378090 A1* | 12/2014 | Hall | A63F 13/216 455/404.2 |

(Continued)

*Primary Examiner* — Jung Liu
(74) *Attorney, Agent, or Firm* — Wash Park IP Ltd.; John T. Kennedy

(57) ABSTRACT

Devices, systems and processes for facilitating ad hoc communications in dense areas are described. A system may include a first user source device (USD) communicatively coupled to an internal net, a first user destination device (UDD) communicatively coupled to an external net and a user hub device (UHD), coupled to each of the internal net and the external. The UHD may facilitate connectivity between the first USD and the first UDD via the internal net and the external net. The internal net may use a common use communications technology, and may be formed in a dense area. The internal net may be formed on an ad hoc basis. The external net may use a public wireless system provider communications system located external to the dense area.

20 Claims, 4 Drawing Sheets

(56) References Cited

U.S. PATENT DOCUMENTS

| | | | |
|---|---|---|---|
| 2016/0021511 A1* | 1/2016 | Jin | H04W 4/021 |
| | | | 455/457 |
| 2016/0139241 A1* | 5/2016 | Holz | H04B 17/318 |
| | | | 367/128 |
| 2016/0309345 A1* | 10/2016 | Tehrani | H04W 72/0426 |
| 2019/0174200 A1* | 6/2019 | Choi | H04N 21/4305 |
| 2019/0261433 A1* | 8/2019 | Turner | H04W 76/10 |

* cited by examiner

DEVICES, SYSTEMS AND PROCESSES FOR FACILITATING AD HOC COMMUNICATIONS IN DENSE AREAS

TECHNICAL FIELD

The technology described herein generally relates to devices, systems and processes for facilitating communications between a first user device and one or more second/remote user devices, each device being present in a dense geographic area, where such density may arise from geographic interferences with communication links, saturation of an area with devices desiring use of limited communications resources, or otherwise. The technology described herein also relates to devices, systems and processes for facilitating communications between the first user device and a second user device, system or service located at a networked destination, wherein the networked destination is located outside of the dense geographic area in which the first user device is then located. The technology described is also related to use of a third user device, configured as a user hub device, to facilitate communications between the first user device and the second user device. The technology described also relates to facilitating such communications using the third user device on an ad hoc basis. The technology described herein also relates to the use of one or more fourth user intermediary devices to further facilitate communications between the first user device and the third user device. The technology described herein also relates to the use of one or more network components to facilitate communications between the third user device and the networked destination.

BACKGROUND

Various commercial entities provide 3G/4G/5G, WIFI and other cellular and/or wireless communications systems for use by user devices, such as smartphones, tablets, laptop computers and other devices. Non-limiting examples of such cellular and/or wireless communications systems providers include AT&T, VERIZON, T-MOBILE and others (herein, each individually and collectively being "public wireless systems providers"). Each of such providers are identified as a "wireless component (WC)."

Yet, when seeking to use a wireless component, a user device may encounter "last mile" limitations. That is, a connection between a given user device and a wireless component may be inhibited, degraded, and, under various conditions, impossible; even though a given user device is within a theoretical coverage area of a given wireless component.

Notably, many users may attend events in a given geographically definable area, such as at a stadium, arena, auditorium, concert venue, church, or otherwise. Such an area is identified herein as being an "event area." Similarly, users of mobile devices often are located in national parks, wilderness areas, national forests, remote landscapes, dense city environments or other geographical areas (herein, each being a "geographic area").

Yet, event areas and geographic areas often encounter last mile limitations. Such areas are often communications resource impacted because available wireless components are often resource constrained, if not inoperable, due to the numerous users desiring to establish communications links with other users, due to geographic considerations, or otherwise. Accordingly, herein event areas and geographic areas are collectively identified herein as each giving rise to a "dense area" where such density may arise in whole or in part from the presence of geographical limitations, user density, available communications resources, or otherwise, such constraints being identified individually and collectively as "communications constraints."

Essentially, users in dense areas may experience bandwidth, frequency, channel, geographic obstacles, signal interference, and other communications constraints that inhibit, if not prohibit, the establishment of last mile communications links between a given user device and a wireless component (WC).

More specifically, communications constraints in dense areas often inhibit and/or degrade connections, provided by one or more wireless components (WC), needed for a user of a given user device (herein, a "user source device (USD)") to communicate data with a destination device, system, or service (herein, a "user destination device (UDD)"). The UDD may be located within or external to the dense area.

Further, such communications links are often desired to be established on an ad hoc basis from a USD with one or more UDDs. As used herein, "ad hoc" refers to communications that are necessary and use communications links that are not pre-planned, organized, or rehearsed. Further, an ad hoc need to communicate by a given USD with a given UDD, or vice versa, may arise with respect to multiple USDs within the dense area and within a limited time period. For example, during an emergency, multiple users may desire to then communicate with a loved one, an emergency responder, or otherwise.

Further, such ad hoc communications may involve any form of humanly perceptible communications, such as text, voice, video, email, chat, video conferencing, audio conferencing, instant messaging, and otherwise. Likewise such ad hoc communications may involve a desire to communicate non-humanly perceptible information, such as environmental, physiological, biological, radiological, or other types of information in one or more of a pre-processed, semi-processed, or processed format. Likewise, the need for such ad hoc communications within a dense area may vary from one given time to another in terms of one or more of types of information communicated, volume/size of information to be communicated, resolution of information communicated, source(s) and/or destination(s) of the information to be communicated, number of USDs/UDDs at a given time seeking to communicate, and otherwise. That is, the communications environment arising within a dense area may be fluid, randomly changing, and/or unpredictably changing. Such dynamics associated with a communications environment in a dense area often result in available wireless components (WCs) becoming oversaturated, overburdened, or otherwise limited and thereby effectively inoperable and ineffective for communicating data between two or more USDs and between USDs and UDDs.

Accordingly, the various embodiments of the present disclosure address these and other non-trivial technical hurdles to provide devices, systems, and processes for facilitating ad hoc communications between one or more USD located within a dense area and/or one or more USDs with one or more UDDs on an ad hoc, dynamic, fluid, random, ever changing, or other basis.

SUMMARY

The various embodiments of the present disclosure relate in general to devices, systems and processes for facilitating ad hoc communications between USDs, and/or USDs and UDDs in a dense area. In accordance with at least one embodiment of the present disclosure, a system, for facilitating ad hoc communications in dense areas, may include a first user source device (USD) communicatively coupled to an internal net. The system may further include a first user destination device (UDD) communicatively coupled to an external net. The system may further include a user hub device (UHD), coupled to each of the internal net and the external, and configured to facilitate connectivity between the first USD and the first UDD via the internal net and the external net. For at least one embodiment, the internal net may use a common use communications technology. The internal net may be formed in a dense area. The internal net may be formed on an ad hoc basis. The external net may use a public wireless system provider communications system located external to the dense area.

For a least one embodiment, the system be used in a dense are that may include an event area. The event area may include one or more of a stadium, arena, auditorium, concert venue, a church, or another location at which more than ten (10) persons may congregate. For at least one embodiment, the event area may be a geographic area.

For at least one embodiment, a system may include use of a first USD that includes a hardware processor configured to execute non-transient computer instructions for use in forming the internal net by performing one or more operations including: broadcasting an available signal; awaiting receipt of a first response to the available signal; determining whether a sub-internal net exists; forming the internal net when the sub-internal net does not exist; determining whether a sub-external net exists; and instructing the UHD to form the external net when the sub-external net does not exist.

For at least one embodiment, a system may include a first USD that includes a hardware processor configured to execute non-transient computer instructions for a facilitating a user circle engine. The user circle engine may be configured to identify any first relationship information regarding the first USD and the first UHD. The hardware processor may be further configured to form the internal net based upon the first relationship information.

For at least one embodiment, a system may include a first USD that includes a hardware processor configured to execute non-transient computer instructions for facilitating a geo-routing engine. The geo-routing engine may be configured to identify a first link for use in communicatively coupling the first USD with the first UHD. The hardware processor may be further configured for form the internal net using the first link.

For at least one embodiment, a system may include at least two user intermediary devices (UIDs). A user circle engine may be configured to provide a second relationship information regarding the first USD and a first of the at least two UIDs, and a third relationship information regarding the first USD and a second of the at least two UIDs. A geo-routing engine may be configured to identify a second link for use in communicatively coupling the first USD with the first of the at least two UIDs.

For at least one embodiment, the geo-routing engine may be further configured to identify a third link for use in communicatively coupling the first USD with the second of the at least two UIDs. The hardware processor may be configured to form the internal net based upon one of the first relationship information and a combination of the second relationship information with the third relationship information. The hardware processor may be configured to form the internal net using one of the first link and a combination of the second link and the third link. The hardware processor may be configured to form the internal net in view of at least one communications constraint.

For at least one embodiment, a communications constraint may include a minimum bandwidth requirement.

In accordance with at least one embodiment of the present disclosure, a process, for facilitating ad hoc communications in a dense area may include forming a first internal net between a user source device (USD) and a user hub device (UHD). The process may also include forming an external net between the UHD and a user destination device (UDD). The first internal net may be formed in a dense area, on an ad hoc basis, and using a common use communications technology. The external net may be formed using a public wireless system provider communications system component located external to the dense area.

For at least one embodiment, the dense area may be one of an event area and a geographic area. The event area may include one or more of a stadium, an arena, an auditorium, a concert venue, a church, or another area with ten (10) or more persons.

For at least one embodiment, a process may include forming of the first internal net by broadcasting by the USD an available signal and awaiting receipt of a response signal from at least two responding user devices. For at least one embodiment, at least two responding user devices includes a first user intermediary device (UID) and the UHD.

For at least one embodiment, a process may include, upon receiving the response signal, determining whether an adequate sub-internal net exists between the at least two responding user devices. If the determination results in the affirmative, the process may include forming the internal net using a first link between the USD and the first UID with the adequate sub-internal net.

For at least one embodiment, a process may include determining whether an adequate sub-external net exists between the UHD and the UDD. When the adequate sub-external net does not exist, the process may include separately forming the external net. When the adequate sub-external net exists, the process may include using the sub-external net as the external net and forming a communications net between the USD and the UDD by combining the internal net with the external net.

For at least one embodiment, a determination of whether an adequate sub-internal net and an adequate sub-external net exist are made in view of at least one communications constraint. The at least one communications constraint may include a bandwidth requirement.

For at least one embodiment, a process may include, when the at least two responding devices further comprise a second UID, facilitating a user circle engine on the USD configured to: identify first relationship information regarding the USD and the first UID; identify second relationship information regarding the USD and the second UID; and, based upon the first relationship information and the second relationship information, forming the internal net using one of the first UID and the second UID.

In accordance with at least one embodiment of the present disclosure, a user source device (USD), configured for use in facilitating ad hoc communications in dense areas, may include a hardware processor configured to execute non-transient computer instructions for facilitating each of a user circle engine. The user device may also include an interface module configured to communicatively couple the USD with a user hub device (UHD). For at least one embodiment, each of the USD and the UHD may be located within a dense area. For at least one embodiment, the user circle engine may be further configured to instruct the interface module to communicatively couple the USD with the UHD over an internal link. For at least one embodiment, such coupling may occur on an ad hoc basis. For at least one embodiment, the UHD may be communicatively coupled to a user destination device (UDD) using an external link. Via use of the internal link, the UHD, and the external link, the user circle engine may be configured to facilitate communications between a user of the USD and the UDD. For at least one embodiment, the dense area may exist in one or more of a stadium, an arena, an auditorium, a concert venue, a church, or otherwise.

For at least one embodiment, the internal net may use a common use communications technology.

For at least one embodiment, the external net may use a public wireless system provider communications system located external to the dense area.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and processes for facilitating ad hoc communications in a dense area. As discussed above and as used herein, a dense area may arise due to a number of user devices overwhelming wireless components (WCs) otherwise available within an event area and/or a geographic area.

Figure 1:
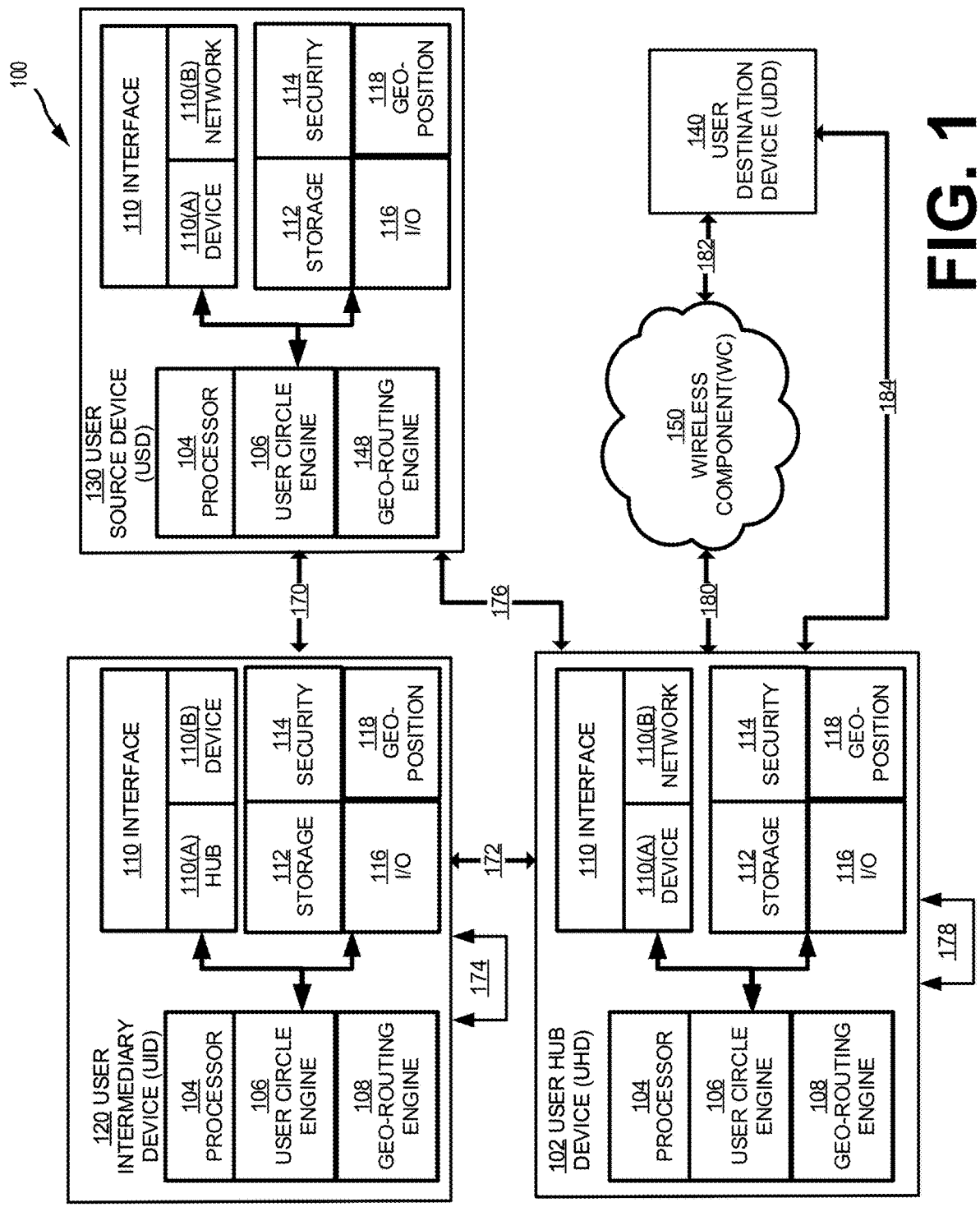
FIG. 1 is a schematic diagram illustrating a system configured in accordance with at least one embodiment of the present disclosure to facilitate ad hoc communications in dense areas.

As shown in FIG. 1, for at least one embodiment of the present disclosure, a system 100 for facilitating ad hoc communications between at least one USD, located in a dense area, and a UDD may include a user hub device (UHD) 102, at least one user source device (USD) 130, at least one wireless component (WC) 150, and at least one user destination device (UDD) 140. As further, shown, one or more user intermediary devices (UIDs) 120 may be used in the system 100 to facilitate communications between the USD 130 and the UDD 140 via each of the one or more UIDs 120 and the UHD 102. Further, communications between two or more USDs 130 within a dense area may be facilitated by one or more UIDs 120.

Figure 2:
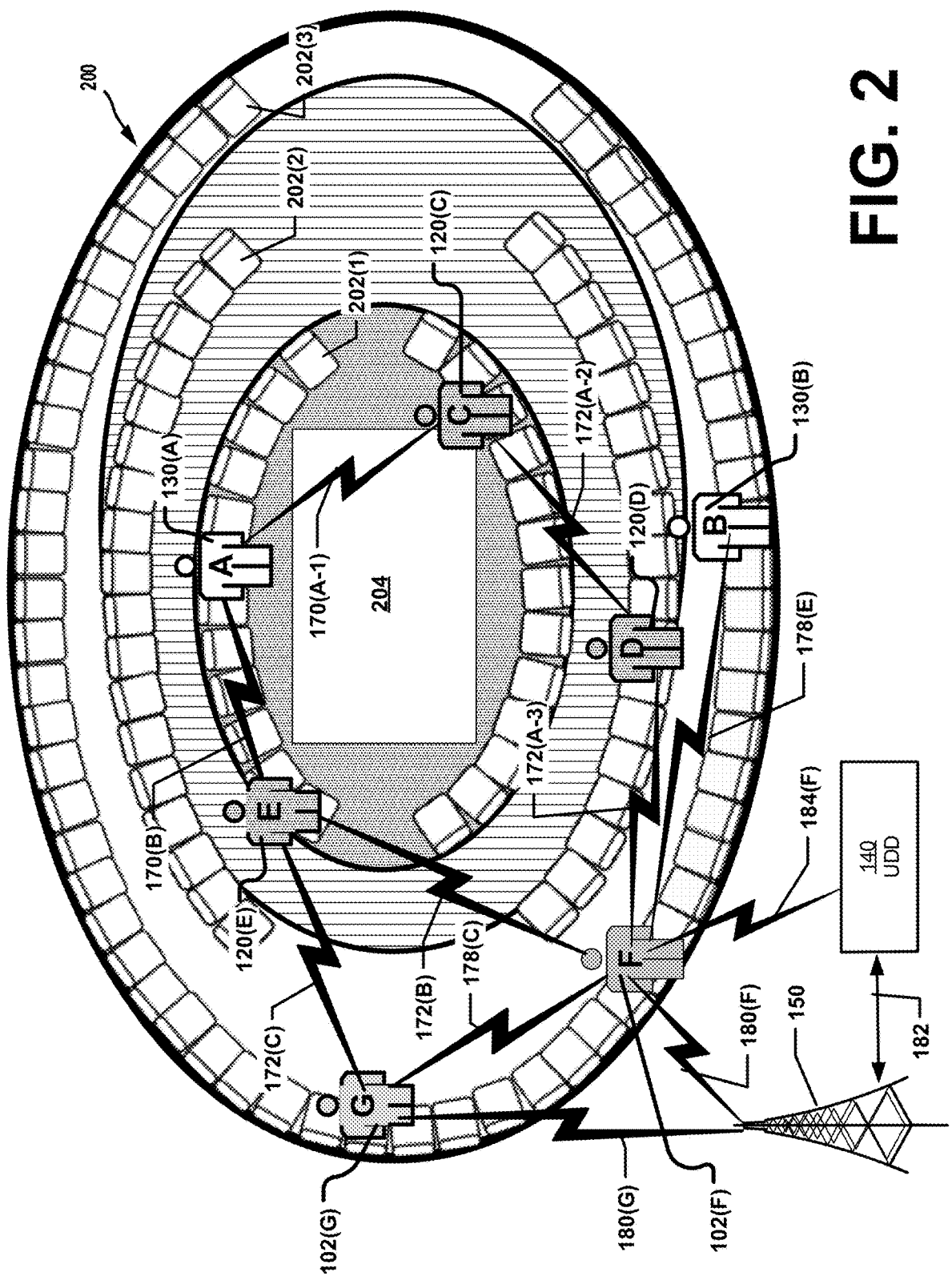
FIG. 2 is an illustrative representation of a use of a system embodiment of the present disclosure to facilitate ad hoc communications in a dense area that involves an event area.
Figure 3:
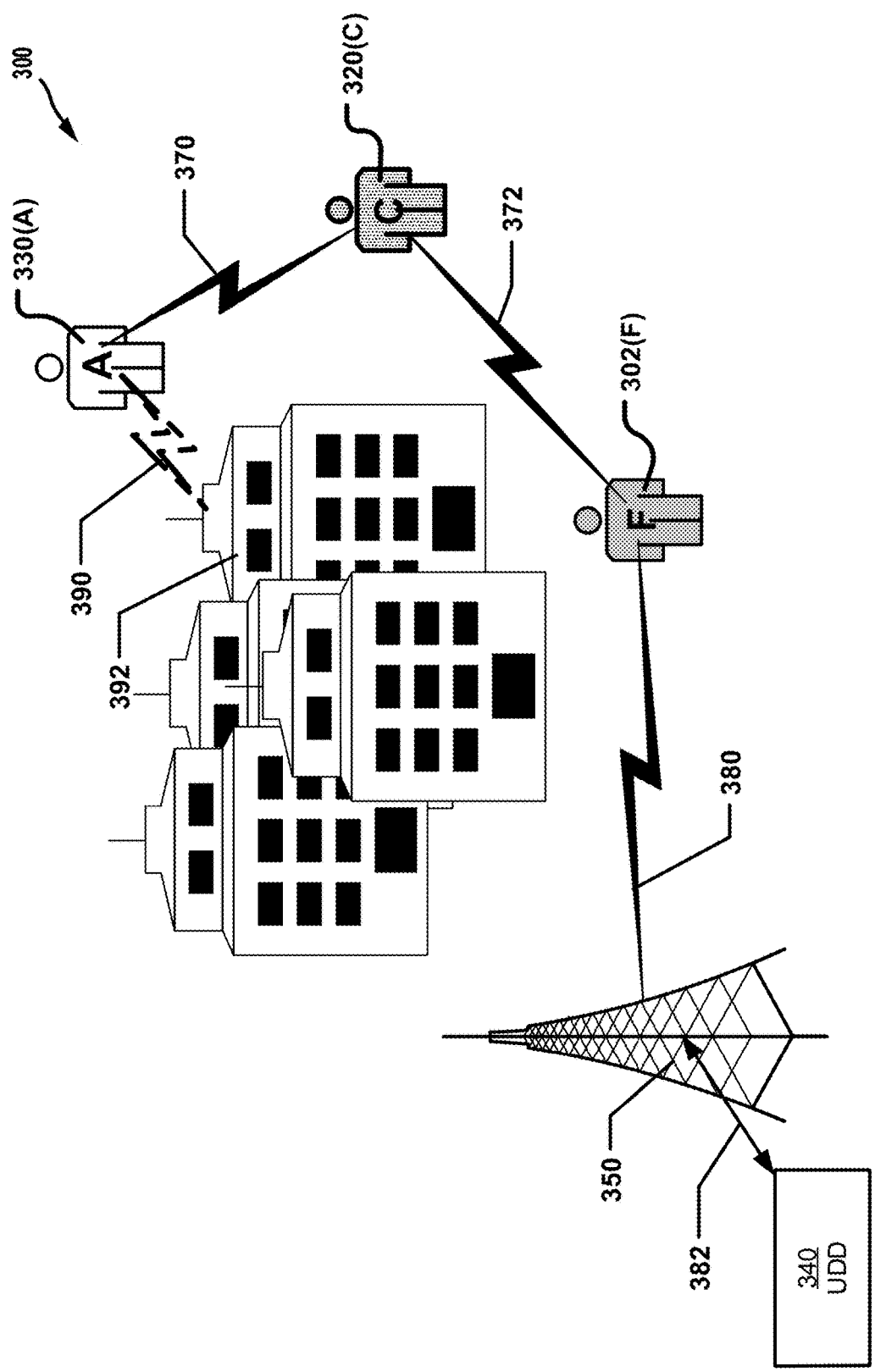
FIG. 3 is an illustrative representation of a use of a system embodiment of the present disclosure to facilitate ad hoc communications in a dense area that involves a geographic area, such as a business district.

As further shown in FIG. 1, permutations of communications links (herein, "links") may be utilized in a given embodiment including, but not limited to (and as illustratively shown in FIGS. 2 and 3 and discussed below), a "first link" 170 between a USD and a UID, a "second link" 172 between a UID and a UHD, a "third link" 174 between a UID and another UID, a "fourth link" 176 between a USD and a UHD. A "fifth link" 178 between a UHD and another UHD. A "sixth link" 180 may be used to couple a UHD with a WC. A "seventh link" 182 may be used to couple a WC with a UDD. And, an "eighth link" 184 may be used to couple a UHD with a UDD. Various permutations of non-limiting uses of such links are shown in FIGS. 2 and 3.

As used herein, links 170 to 178 may be singularly and/or collectively used, in any then desired permutation, to form a "internal net" within a given dense area. As used herein, an internal net commonly includes at least one USD 130 and at least one of a UID 120 and a UHD 102. As used herein, an internal net is formed between private user devices, on an ad hoc basis, and is not formed by use of a public wireless systems provider.

Links 180 to 184 may be singularly and/or collectively used, in any then desired permutation, to form an "external net." As used herein, an external net includes at least one UHD 102 and at least one UDD 140. As used herein, a combination of an internal net and an external net forms a "communications net."

For at least one embodiment, each of a USD 130, UID 120, UHD 102, and UDD 140 may be similarly configured devices, such as smartphones. For at least one embodiment, UDDs may be configured as any desired user device, service, system, application, database, or otherwise. UDDs may be hosted on remote servers, user devices, or otherwise.

The distinctions arising between a USD 130, UID 120, UHD 104, and UDD 140 at any given time, may thus arise due to the functions and capabilities then being used by the given device. Further, each of a UID 120 and a UHD 102 may also function as a USD 130 with respect to the use thereof to communicate with one or more UDDs 140 and/or with one or more USDs 130 within a dense area. That is, a UHD 102 may function as a gateway facilitating communications between a given USD 130 and a UDD 140 while also functioning as a USD 130 for facilitating communications between a user of that given device and another USD 130 or UDD 140.

For at least one embodiment, a UID 120 may similarly function as both an intermediary, for use in communicatively coupling a given USD 130 with a UHD 102, as well as a USD 130 for facilitating communications by a user of such device, via another UID 120 with another USD 130, or via a UHD 102 with a UDD 140. For at least one embodiment, a UID 120 and/or a UHD 102 may be configured to facilitate a local group, such as a group chat, amongst two or more USDs 130 within a given dense area and/or amongst USDs 130 and UDDs 140. Accordingly, it is to be appreciated that a given user device may perform multiple roles at any given time, while performing fewer or more roles at other times.

For at least one embodiment, the links used to form an internal net and/or external net may use any currently known or later arising communications technologies. For at least one embodiment, links for an internal net may be established using peer-to-peer communications technologies. For at least one embodiment, an internal net may use a hub and spoke configuration, with a UID 120 or a UHD 140 at the center/hub of the spokes. Further, the links for an internal net may be self-forming, decentralized, point-to-multi-point, or use other communications topologies. The internal net links may form in different topologies based upon then arising intended use. For example, a communication between a USD 130 and a UHD 102 may be formed using one or more, if any, UIDs 120.

For at least one embodiment, additional users may be added to an internal net, as desired, by modifying the internal net topology accordingly. For example, a UID 120 or UHD 102 may be configured to function as a hub that broadcasts communications between multiple user devices, such devices then functioning in, at least, a USD role.

For at least one embodiment, a single UHD 102 may be utilized to couple one or more UDDs 140 to an internal net formed with a USD 130 in a dense area. For another embodiment, multiple UHDs 102 may be utilized to couple multiple UDDs 140 to an internal formed with one or more USDs 130 in a dense area. For at least one embodiment, multiple internal nets may be formed using one or more USDs 130, UIDs 120 and/or UHDs 102. For at least one embodiment, multiple external nets may be formed using one or more UHDs 102, UDDs 140, and/or one or more WCs 150.

For at least one embodiment, one or more internal net links may be established using WIFI radio technologies, long range BLUETOOTH technologies, normal range BLUETOOTH, or freely available/public/common use wireless communications technologies (herein, each individually and collectively being a "common use communications" technology, service, protocol, system or otherwise).

For at least one embodiment, one or more external net links may be established using common cellular communications technologies including, but not limited to, 3G/4G/5G technologies. For at least one embodiment, one or more external net links may be established using any desired communications technology including use of Ethernet, the Internet, private networks, public networks, the plain old telephone service (POTS), microwave, fiber-optic, wireless, wired, cellular or other networking and/or communications technologies and combinations thereof.

As shown in FIG. 2, at least one embodiment of the present disclosure may be used in an event area that includes a stadium 200 or similar venue. The stadium 200 may include multiple seats 202 arranged across one or more tiers, such as tier one seats 202(1), tier two seats 202(2), and tier three seats 202(3). Other seating configurations may be used for any given implementation. Further, numerous users A, C-G may be situated in the stadium 200. Each user A, C-G in the stadium 200 may be equipped with a user device that, depending upon then arising mode of operation, may function as a USD 130, UID 120 or UHD 102.

In FIG. 2, USDs A/B are depicted without shading, UIDs C/D/E with partial shading, and UHDs F/G with solid shading. As shown, the two USDs 130(A)/130(B) may be each communicatively and respectively coupled to a UDD 140 using an internal net that includes one or more communication links that may be dynamically configured based upon then arising and available UIDs and/or UHDs. It is to be appreciated that the communication links used to form a given internal net may vary based upon capabilities of a given user device, the ability of such given user device to then function as a UID or a UHD, and/or other factors and/or communications constraints.

For example, USD 130(A) may form an internal net that is communicatively couple, via one or more of UHD 102(F) and/or UHD 102(G), with an external net coupling a WC component 150 with a UDD 140. The internal net may, at any given time, use various links to couple USD 130(A) with either UHD 102(F) or UHD 102(G). As used, herein, an alphabetic designator (such as "A") is used designate a route used for a given internal net and a numeric designator (such as "1/2/3/4/5") is used to indicate a sequence number of link used to facilitate such communications. It is to be appreciated that communications may be unidirectional and/or bidirectional.

For a non-limiting example, an "A" internal net coupling USD 130(A) with UHD 102(F) may include links 170(A-1), 172(A-2), and 172(A-3). Similarly, a "B" internal net coupling USD 130(A) with UHD 102(F) may include links 170(B) and 172(B). Similarly, a "C" internal net coupling USD 130(A) with UHD 102(F) may include links 170(B), 172(C), and 178(C). Similarly, a "D" internal net coupling USD 130(A) with UHD 102(G) may include links 170(B) and 172(C). Similarly, an "E" internal net coupling USD 130(B) with UHD 102(G) may includes link 178(E).

Further, various external nets may be formed depending on the UHD used at that time. For a non-limiting example, an "F" external net between UHD 102(F) and UDD 140 may be formed using links 180(F) and 182 or link 184(F). Similarly, a "G" external net between UHD 102(G) and UDD 140 may be formed using links 180(G) and 182.

It is to be appreciated that internal nets and external nets may use any desired links and/or combinations thereof at any given time. The use of a given link may depend upon an availability of a UID, UHD, WC and/or capabilities supported by such device at a given time.

For at least one embodiment, the user devices may be configured to establish appropriate links based upon then available linking options, in view of parameters associated with each of such links, such as bandwidth, latency, or the like, in view of the type of information desired to be communicated by a given source user, and otherwise.

As shown in FIG. 3, at least one embodiment of the present disclosure may be used in a geographic area that arises due to topography, signal interferences, or other considerations. For example, in an urban area, a first user A operating a USD 330(A) may be communicatively coupled to a UDD 340 by a second user C, operating a UID 320(C), and a third user F, operating a UHD 302(F). As shown a first direct link 390 between the first USD 330(A) and a WC 350 is interfered with by a building 392 or other geographic feature. Accordingly, a use of an embodiment of the present disclosure facilitates communications between the first USD 330(A) and the UDD 340 by use of UID 320(C) and UHD 302(F) and in an environment where, absent use of an embodiment of the present disclosure, such communications would otherwise not be possible.

Referring again to FIG. 1 and as mentioned above, each of the USD 130, UID 120 and UHD 102 may have similar components and capabilities, with various uses of such components and capabilities arising based upon a then occurring role or function performed by each such device. Accordingly, each of the USDs, UIDs and UHDs described herein are described in common with respect to a common "user device" with these role based differences being noted accordingly herein.

Processor Module (104)

Referring again to FIG. 1, a user device may include one or more processor modules 104 configured to provide computer implemented software and hardware engines including, at least, a user circle engine 106 and a geo-routing engine 108. Other computer implemented engines may be provided for other embodiments.

The processor module 104 may be configured to provide any desired data and/or signal processing capabilities. For at least one embodiment, the processor module 104 may have access to one or more non-transitory processor readable instructions, including instructions for executing one or more applications, engines, and/or processes configured to instruct the processor to perform computer executable operations (hereafter, "computer instructions"). The processor module 104 may use any known or later arising processor capable of providing and/or supporting the features and functions of a given user device as needed for any given intended use thereof and in accordance with one or more of the various embodiments of the present disclosure.

For at least one non-limiting embodiment, the processor module 104 may be configured as and/or has the capabilities of a 32-bit or 64-bit, multi-core ARM based processor. For at least one embodiment, the processor module 104 may use, in whole or in part, one or more backend systems, such as server systems or otherwise. Computer instructions may include firmware and software instructions, and associated data for use in operating a given user device, as executed by the processor module 104. Such computer instructions provide computer executable operations that facilitate one or more features or functions of a given user device and in accordance with one or more embodiments of the present disclosure.

User Circle Engine (106)

For at least one embodiment, the processor module 104 may be configured to implement computer instructions for configuring a user device to function as a node connecting two or more user devices, and between UHDs 102 and a UDD 140 directly and/or via one or more WCs 150. For at least one embodiment, a user circle engine 106 may be executed by each processor module 104 for those user devices participating on a given communications net. The user circle engine 106 may be a combination of a hardware processor and computer instructions. In other embodiments, the user circle engine 106 may be implemented by a dedicated or separate processing component. The user circle engine 106 may be configured to provide a given user device (USD/UID/UHD) with capabilities of designating, defining, generating, managing, manipulating, using and/or providing links between two or more user devices.

As used herein a user circle is defined to be a grouping of two or more user devices (e.g., USDs, UIDs and/or UHDs), as established at a given point of time, using one or more links, and via which one or more of such user devices may be communicatively coupled with another device using an internal net. The internal net may provide for direct or indirect links between two or more user devices. The internal net may use, for non-limiting examples, peer-to-peer, hub and spoke, star, or other communications topologies. The user circle engine 106 may be configured to permit certain known, discoverable, unknown or other devices within a given dense area to join in a given user circle.

For at least one embodiment, a user circle may be formed such that a UHD 102 participating therein further provides communicative coupling for one or more USD in the internal circle with an external net formed with one or more UDDs 140. As discussed above, an external net may be formed either directly or indirectly with one or more UDDs, such as using one or more WCs 160.

For at least one embodiment, a user circle commonly includes at least one USB (such as USB 130(A) of FIG. 2), and may include at least one second USD (such as USB 130(B) of FIG. 2). A user circle also commonly includes at least one of a UIB 120 and a UHD 102. When two USBs are used in a user circle, one USB may operate as a source of data, while the other operates as a destination. Such roles may coexist at any given time and each device or may vary its role over time, such that simplex, duplex or other communications types may be supported within the user circle over the internal net then arising. For at least one embodiment, communications between members of a user circle may be provided by use of broadcast, multi-cast, and/or point-to-point communications.

For at least one embodiment, a user circle may be formed to facilitate communications with a UDD 140 and when so formed commonly includes at least one USB 130 and a UHD 102. The UDD 140, arising on an external net, may also be included in a given user circle for at least one embodiment of the present disclosure.

For at least one embodiment, the user circle engine 106 may include a UHD 102 configured to operate as a hub and spoke which facilitates communications between a first USD 130(A) and a second USD 130(B) within a given dense geographic area and over an ad hoc and/or then arising internal net. For example, communications between two users within a stadium may be facilitated, as shown in FIG. 2, using UHD 102(F) as a hub of a user circle that includes "spokes"/links between USBs 130(A) and 130(B), such as links 170(A-1), 172(A-2), 172(A-3), and 178(E).

For at least one embodiment, a user circle engine 106 may be configured to identify available any acceptable user devices for coupling together using an internal net. Such identification may be based upon relationship information stored in a storage device 112, such as an approved user list or the like. For at least one embodiment, relationship information may be used between each of two or more of a USD, a UID, and a UHD.

For at least one embodiment, a user circle engine 106 may be configured to invite and/or accept user devices into a given user circle based upon passcodes, security keys, relationship information, or other information exchanged and/or arising between and/or relating to two or more user devices. For at least one embodiment, a user circle engine 106 may be configured to accept any user device within range thereof and/or satisfying/over-coming one or more communications constraints into a user circle. For at least one embodiment, a user circle may include use of multiple internal nets, where different nets are used to communicatively couple different user devices together.

A user circle may occur privately, wherein participation in the user circle is limited to a selected group of users. A user circle may occur publicly, wherein participation in the user circle is unlimited and any person having access to such user circle may join. Participation in a user circle may occur upon invitation. A user circle may occur at any desired level of openness ranging from private to public.

For at least one embodiment, a user circle seeks to provide information available to form an ad hoc connection between two or more user devices in a dense area using one or more internal nets. To facilitate such connections and internal net(s) being formed, each user device may be configured to periodically output one more "available" signals. The available signals may be used to identify a capability of a given user device to participate as a UID and/or UHD in a user circle and with respect to one or more formed or to be formed internal nets. The capability of a given user device to participate as a USD may also be identified for at least one embodiment. It is to be appreciated that a given user device may not have the same capabilities, as a USD/UID/UHD, as another user device. For example, a first user device may be capable of presenting, communicating or otherwise processing 4K video signals while another user device is capable only presenting only up to 1080p video signals. Likewise, capabilities of user devices to function as a UID and/or a UHD may vary. The user circle engine 106 in each device desiring to participate in a given user circle, and/or with respect to a given internal net, may be configured to recognize capabilities of other user devices participating in the given user circle, and/or a given internal net, and based upon such capabilities, adapt one or more of types of data communicated, or other communications constraints thereto. Further, for at least one embodiment and when capable of functioning as a UHD, the available signal may identify the one or more external nets, WCs 160 and/or UDDs 140 with which the UHD is configurable to communicatively couple with and/or then communicatively coupled to.

Geo-Routing Engine (108)

For at least one embodiment, the UHD processor module 104 may be configured to implement computer instructions for a geo-routing engine 108, such instruction may also and/or alternatively be implemented by a dedicated or separate processing component. For at least one embodiment, the geo-routing engine 108 provides the UHD 102 with capabilities of dynamically configuring internal nets based upon geo-location information of USD, UIDs and UHDs. The geo-routing engine 108 may utilize geo-location information provided by any source or otherwise determinable by a user device. Such geo-location information may indicate a current location of a user device, which may be determined, for example, based on an indication thereof by a user, such as a section/row/seat location, or based on other geo-location information determinable by a given user device, such as location information provided by GPS and/or other positioning technologies.

The geo-routing engine 108 may also be configured to provide updates used in forming user circles as a given user device location changes. For example, a user associated with a given user device may change their location to go to a concessions area, restrooms, or otherwise. It is to be appreciated, that such a change of location of a given user device may impact signal strengths, signal interference, signal range and other communications constraints and/or concerns and, thus, may result in a reconfiguration of a given internal net based upon such changes.

Interface Module (110)

As further shown in FIG. 1 and for at least one embodiment of the present disclosure, a user device may include an interface module 110. The interface module 110 may include one or more device-to-device interface modules 110(A) used for forming internal nets and/or one or more device-to-network interface modules 110(B) used for forming external nets. The interface module 110 may use any known or later arising technologies for communicatively coupling a user device with one or more second user devices and one or more wireless components WC 1500. Non-limiting examples of such interface modules include hardware and software configured for use with one or more of the BLUETOOTH, ZIGBEE, Near Field Communications, Narrowband IOT, WIFI, 3G, 4G, 5G, cellular, and other currently arising and/or future arising communications technologies. Any known or later arising networking and/or other communications technologies may be used to facilitate direct and/or indirect communications between user devices over internal nets and between user devices and other wireless components (WCs) or UDDs over external nets. For at least one embodiment, communications technologies for a given internal net may vary by link used. The interface 110, in conjunction with the user circle engine 106 and the geo-routing engine 108 may be configured to adapt to link types used based upon user circle then in use, location of user devices, changes in user device locations, and otherwise.

For at least one embodiment, the interface module 110 may be configured to operate as a software defined radio. When so configured, the interface module 110 may use licensed and/or unlicensed frequencies to facilitate formation of an internal net. Such frequencies may be selected based upon type of data to be communicated and other communications constraints.

For at least one embodiment, the interface module 110 may be configured to include one or more data ports for establishing connections between a user device and another device as a laptop computer, a smartphone, a satellite or cable set top box (an "STB") or other device. Such data ports may support any known or later arising technologies, such as USB 2.0, USB 3.0, ETHERNET, FIREWIRE, HDMI, wireless technologies, and others. The interface module 110 may be configured to support the transfer of data formatted using any desired protocol and at any desired data rates/speeds. The interface module 110 may be connected to one or more antennas (not shown) to facilitate wireless data transfers. Such antenna may support short-range technologies, such as 802.11a/c/g/n and others, and/or long-range technologies, such as 4G, 5G, and others. The interface module 110 may be configured to communicate signals using terrestrial systems, space-based systems, and combinations thereof. For example, a user device may be configured to receive global positioning ("GPS") signals from a satellite directly or otherwise.

Storage Module (112)

For at least one embodiment, a user device may include one or more storage module(s) 112. Computer instructions, data sets and/or other information (collectively herein, "stored data") may be stored by such storage module(s) 112 and used by the processor 104 and/or other system hardware and/or software components to provide one or more features and/or capabilities of the various embodiments of the present disclosure. For example, the processor module 104 may be configured to execute, use, implement, modify or otherwise process such stored data. It is to be appreciated that the storage module(s) 112 (each module and/or sub-division thereof a "storage component") may be configured using any known or later arising data storage technologies. In at least one embodiment, storage module(s) 112 may be configured using flash memory technologies, micro-SD card technology, as a solid-state drive, as a hard drive, as an array of storage devices, or otherwise. Storage module(s) 112 may be configured to have any desired data storage size, read/write speed, redundancy, or otherwise. A storage module 112 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise.

Storage module(s) 112 may include one or more databases providing information, instructions and/or data for using in facilitating user circles, geo-routing and otherwise. For at least one embodiment, such databases may include a user preferences database, a history database, a circles database, and a support database. Other databases may be provided for other embodiments.

User Preference Database

For at least one embodiment, information pertaining to a user and/or a population of users (where a population of users is two or more users) may be provided by a user preference database. The storage modules 112 may be configured to collect and provide data relating to one more user's preferences. The user preferences may include any information that may be and/or is useful in supporting one or more user circles. Non-limiting examples of such preferences may include demographic, psychographic, geographic, or other types of information pertaining to a user. The breadth and scope of such types of information, and the degree of specificity and/or anonymity and/or generality associated therewith, is not limited and may vary as desired with the providing, use, or otherwise of one or more user circles. Any source of information may be used in populating the user's preferences database. Preference information may be populated based on user behavior, user input, user device type, or otherwise. Accordingly, the various embodiments of the present disclosure are not intended to be limited to any given set or collection, or source thereof, of user preferences information, unless otherwise so expressly recited.

History Database

For at least one embodiment, information pertaining to a history of user circles may be provided by a history database. The storage modules 112 may be configured to collect and provide data relating to the use, construction of and deconstruction, as appropriate, of user circles. Such data may be useful in facilitating the creation and/or use of future user circles, generating opportunities to monetize the promotion and/or advertising of content in conjunction with and/or in support or response to the use of user circles, and otherwise. The history database, for at least one embodiment, may include information obtained from a user preferences database, where such information provides information about the users participating in one or more user circles at a desired level of anonymity. For example, a history database may include information indicating that certain users in a given stadium previously formed a user circle, for example, during a prior sporting event. Such information being useful for establishing a user circle during a current sporting event, targeting marketing users, and other uses.

Circles Database

For at least one embodiment, a circles database may be configured to collect and provide data relating to one or more presently configured user circles. Such groupings may occur automatically, based on user input, or otherwise. As discussed above, a user circle may be specific to a given content, a given dense area, or otherwise. For example, a user circle may be formed with respect to a content genre (for example, NFL™ football games), a given subset of that genre (for example, SAN FRANCISCO 49ERS games), a given instance of the subset (for example, a 49ERS vs DALLAS COWBOYS game), a given dense area (for example, LEVI stadium), or otherwise. For at least one embodiment, the genre, subset and/or instances of content to be associated with and/or associable with a user circle may be defined to any level of generalization and/or specificity by a user, a group of users in a given user circle, a promotor or organizer of a user circle, or otherwise. For example, a broad generalization may include any content while the before mentioned specified game may include a specific instance of content.

Further, it is to be appreciated that user circles, as related to content, dense area, and otherwise, may be generalized and/or specified (to any level thereof or there-between) to the extent that content itself may be generalized and/or specified. For at least one embodiment, a user circle may be additionally, separately, and/or alternatively specific to a given group of users, such as users A, B and C. Such grouping of users in a given user circle may, as desired, may be specific to a given dense area. User circles may be created based upon any criteria or collection thereof, such as location, user preferences, user history, content to be presented, dense area, or otherwise. The circles database facilitates the storage of data related to circles that the user circle engine 106 may utilize to facilitate use of a user circle.

For at least one embodiment, a user circle might be formed and/or formable for all content being viewed by a given user, such as user A, with other users (such as users B or C) in a given dense area. It is to be appreciated, the storage modules 112 in conjunction with the UHD processor module 104 may be configured to collectively facilitate the creation, use, and otherwise of one or more user circles.

Support Database

For at least one embodiment, a support database may be configured to collect and provide data relating to one or more functions provided by a given user device. The support database may be configured to provide support features, such as tutorials or the like, that provide support for formation of internal nets and external nets. Data provided in such a support database may be used by a user circle engine 106 to create a dynamic, or otherwise, internal net in a given dense area.

Other Databases

For at least one embodiment of the present disclosure, the storage module 112 may include the use, on a transient or non-transient basis, of other databases. The stored data in such other databases being provided for execution and/or use, singularly or collectively, by the processor 104. Any type of stored data and associated computer instructions implemented for use of such stored data may be provided.

Security Module (114)

For at least one embodiment, a user device may separately or using computer instructions executed by the processor module 104 provide a security module 114. The security module 114 provides a user device with capabilities of securing user participation in one or more user circles and with one or more ad hoc formed internal nets and external nets. The security module 114 may be configured to address security needs, including but not limited to, securing the identify of users, securing content communicated via a given link, securing access to a given internal net and/or external net, and other security needs. The security module 114 may operate separately and/or in conjunction with security components provided by other components of the system 100 including those provided by WCs 160, UDDs 140, and otherwise. Any desired known or later arising security technologies, protocols, approaches, schemes, or otherwise may be used in one or more embodiments of the present disclosure by the security module 114.

I/O Module(s) (116)

For at least one embodiment, a user device may include one or more I/O (I/O) module(s) 116. Such modules may include audio, visual, text, and/or gesture I/O module.

Audio I/O Module: Audio I/O modules may be configured to support the providing of audible signals between a user and a user device. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and software (herein, "audio technologies") which supports the input and (as desired) output of audible signals to a user. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one embodiment, an audio I/O module may be configured to use one or more microphones and speakers to capture and present audible information to user. Such one or more microphones and speakers may be provided by a given user device itself or by a device communicatively couple additional audible device component, for example, by earbuds may be communicatively coupled to a smartphone, with the earbuds functioning as an audio I/O module and capturing and presenting audio sounds to and from a user, while the smartphone functions as a user device. Accordingly, it is to be appreciated that any existing or future arising audio I/O devices, systems and/or components may be utilized by and/or in conjunction with a user device to facilitate communications within an internal net and/or for communication over an external net. In at least one embodiment of the present disclosure, users provide their comments audibly for presentation to other users on an internal net and/or on an external net and receive representations of other user's comments also audibly.

For at least one embodiment, an audio I/O module may be configured to automatically recognize and capture comments spoken by a user and intended for sharing on an internal net and/or on an external net. Such identification may occur as a default setting of the audio I/O module into a "capture" mode, based upon analysis and recognition of spoken comments as being intended for one or more second users on a communications net or portion thereof, or otherwise. For example, a comment such as, "Bill, that is just wrong," where "Bill" is the name of a second user on a communications net or portion thereof, may be automatically captured and shared by an audio I/O module with Bill's user device over an internal net. The analysis and determination of which captured sounds to share with select if not all members on a communications net or portion thereof may be accomplished by a user device solely and/or in conjunction with a UID and/or UHD communicatively used for form a given communications net or portion thereof.

For at least one embodiment, a priming key word, such as "Hey <user name>" may also and/or alternatively be used to designate which audio comments, by a first user, are to be shared solely with one more second users on a communications net or portion thereof. While the use of priming key words are supported, for at least one embodiment, the system 100 may be configured to automatically recognize and share users' comments throughout a communications net or portion thereof on a broadcast, multicast, or other, more limited, dissemination basis.

Visual I/O Module: For at least one embodiment, a user device may include a visual I/O module configured to support the providing of visible signals between a user and a user device. Such visible signals may be in any desired form, such as still images, motion images, augmented reality images, virtual reality images and otherwise. Such visible information may include one or more of humanly perceptible visible signals. For at least one embodiment, a visual I/O module may also be configured to capture non-humanly visible images, such as those arising in the X-ray, ultra-violet, infra-red or other spectrum ranges. Such non-humanly visible images may be converted, as desired, into humanly visibly perceptible images by a user device.

For at least one embodiment, a visual I/O module generally includes hardware and software (herein, "visible technologies") which supports the input by and (as desired) output of visible signals to a user. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O module may be configured to use one or more display devices configured to present visible information to user. A visual I/O module may be configured to use one or more image capture devices, such as those provided by lenses, digital image capture and processing software and the like which may be provided by a given user device itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device to facilitate the capture, communication and/or presentation of visual information in conjunction with one or more communications nets or portions thereof. In at least one embodiment of the present disclosure, users provide their comments visibly for presentation to other users on a communications net or portion thereof and receive representations of other user's comments visibly. As discussed above with regard to audible comments, such visible comments may be captured automatically, upon use of one or more priming key images, or otherwise.

Text I/O Module: For at least one embodiment, a user device may include a text I/O module configured to support the providing of textual information by a user using a user device. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language.

A text I/O module generally includes hardware and software (herein, "textual technologies") which supports the input by and (as desired) output of textual information signals to a user. Such textual technologies may include technologies for inputting, outputting, and converting textual content into a given user's perceptible content, such as by character recognition, translation, size/font adjustment, and otherwise. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with a user device to facilitate the use of textual information for dissemination over a communications net or portion thereof. In at least one embodiment of the present disclosure, users provide their comments textually for presentation to other users in a user circle and receive representations of other user's comments textually. As discussed above with regard to audible comments, such textual comments may be captured automatically, upon use of one or more priming key words or textual characters or strings thereof (e.g., the depressing of a "comment" button being indicative that a following string of characters are intended as comments for the user circle), or otherwise.

Gesture I/O Module: For at least one embodiment, a user device may include a gesture I/O module configured to support the providing of gesture information, such as sign language, by a user using a user device. Such gesture information signals may be in any desired form or format. Such gesture information may include one or more of humanly perceptible characters, such as those provided by sign language. For at least one embodiment, a gesture I/O module may also be configured to capture a user's motions to control one or more aspects of a user device, examples of such motions including those commonly used on smartphone touch interfaces.

A gesture I/O module generally includes hardware and software (herein, "gesture technologies") which supports the input by and (as desired) output of gesture information signals to a user. Such gesture technologies may include technologies for inputting, outputting, and converting gesture content into any given form, such as into textual information, audible information, visual information, device instructions or otherwise. In at least one embodiment, a gesture I/O module may be configured to use an input device, such as a motion detecting camera, touch pad, mouse, motion sensors, or other devices configured to capture motion information.

It is to be appreciated that any existing or future arising gesture I/O devices, systems and/or components may be utilized by and/or in conjunction with a user device to facilitate the use of gesture information in one or more user circles and on a communications net or portion thereof. In at least one embodiment of the present disclosure, users provide one or more of their comments via gestures for presentation to other users in a user circle and receive representations of other user's comments in a second desired format, such as audibly, visually, via characters, or otherwise. Thus, it is to be appreciated that the various embodiments of the present disclosure may be configured to use one or more of the described above and/or other I/O devices to facilitate user participation in a user circle. Such I/O devices may be used individually or in any desired combination thereof. As discussed above with regard to audible comments, such gesture comments may be captured automatically, upon use of one or more priming key gestures (e.g., the waving of one's hand in a certain manner, or nodding or shaking one's head), or otherwise.

Geo-Position Module (118)

For at least one embodiment, a user device may include a geo-position module 118 configured to identify a position of a given user device. The geo-position module 118 may be configured to use any device position determining technology, including but not limited to, global positioning technologies, IP addressing, user input (e.g., a user inputs their location by use of any user compatible input format), or otherwise. Position information generated and/or captured by a geo-position module 118 may be utilized by processor module 104 to facilitate use of user circles and formation of internal nets and external nets.

Wireless Components (150)

As shown in FIG. 1, the system 100 may also include one or more wireless components (WC) 150. Non-limiting examples of such networked components include network storage modules, network processor modules, and network support modules.

Wireless Component Storage Modules: For at least one embodiment, wireless component storage modules may be communicatively coupled to a UHD 102 by one or more links. The wireless component storage modules may be provided via any wireless and/or networked devices and/or systems, such as those communicatively accessible via 3G/4G/5G systems, the Internet, or other communications and/or networking technologies including but not limited to local, regional, private, public or other networking technologies. It is to be appreciated that the wireless component storage modules may also be referred to herein as a storage component and may be configured using any known or later arising data storage technologies. In at least one embodiment, a wireless component storage module may be configured using flash memory technologies, micro-SD card technology, as a solid-state drive, as a hard drive, as an array of storage devices, or otherwise. A wireless component storage module may be configured to have any desired data storage size, read/write speed, redundancy, or otherwise. A wireless component storage module may be configured to provide temporary/transient and/or permanent/non-transient storage of one or more data sets, computer instructions, and/or other information.

Wireless component Processor Module: For at least one embodiment, one or more wireless component processor modules may be configured to execute computer instructions which facilitate in whole, or in part, the formation of external nets. Wireless component processor modules may use any known or later arising network and/or server based technologies. Such wireless component processor modules may be configured to support and/or perform, separately and/or in conjunction with one or more of a UHD 102, one or more computer instructions utilized in facilitating one or more external nets.

Wireless component Support Module: For at least one embodiment, one or more wireless component support modules may be configured to execute computer instructions which facilitate in whole, or in part, the use of external nets. Wireless component support modules may use any known or later arising network and/or server based technologies that facilitate support of a user with respect to an external net or other technology issue.

Figure 4:
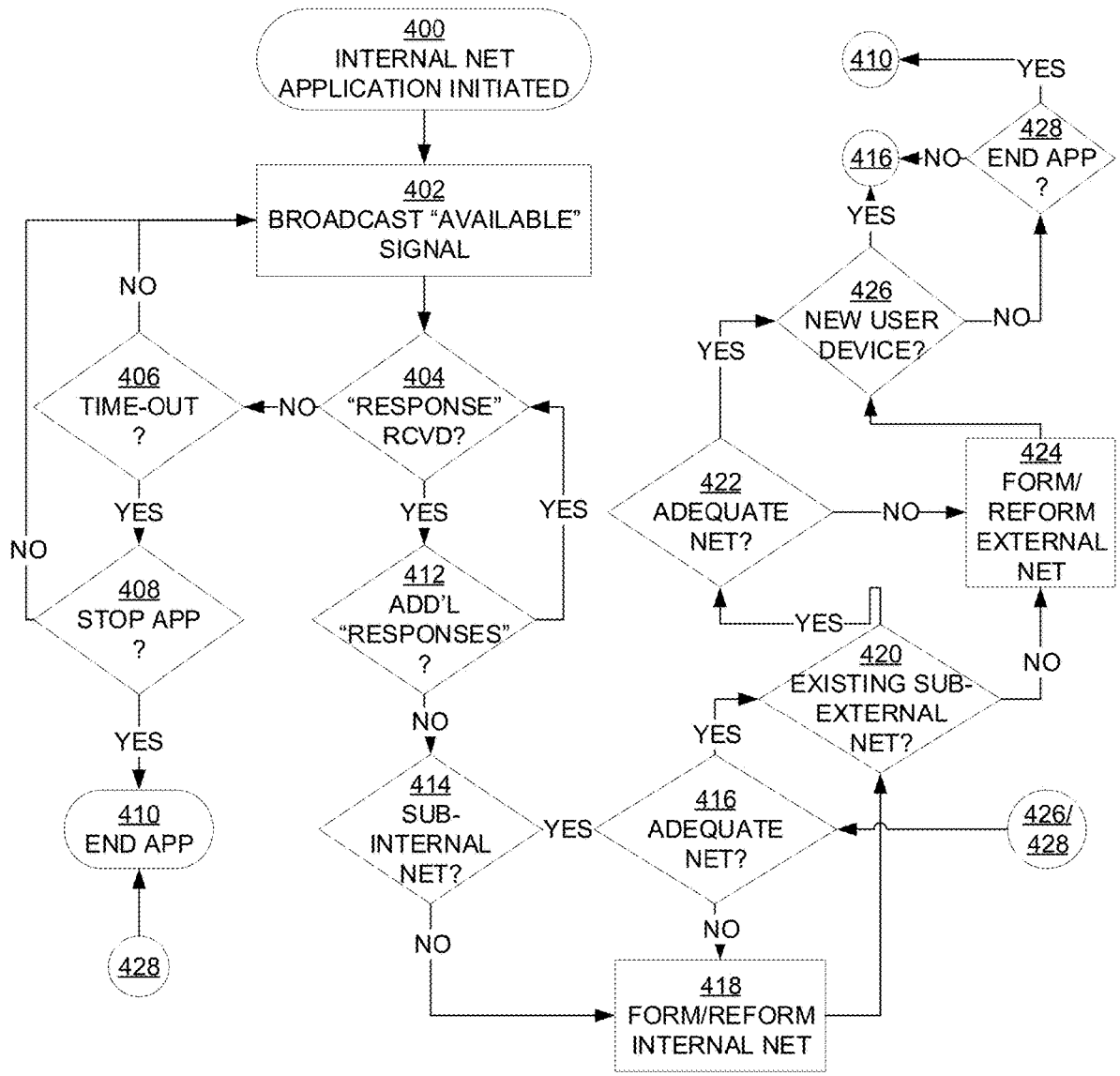
FIG. 4 is a flowchart illustrating a process for facilitating ad hoc communications in a dense area and in accordance with at least one embodiment of the present disclosure.

In FIG. 4 and for at least one embodiment of the present disclosure, a process for facilitating ad hoc communications in a dense area is shown.

Per Operation 400, the process may begin with an internal networking application being initiated by a first user device. Herein, such an application (herein, an "ad hoc net app") provides computer instructions for use on a given user device, such as a smartphone, tablet or similar device, which initiates participation in and/or for forming of an ad hoc internal net. It is to be appreciated that for at least one embodiment, a first user device may initiate the ad hoc net app every time the user desires to participate in an internal net. For another embodiment, the ad hoc net app may be initiated once and run in a background mode with the application being inoperable while certain minimum communications constraints are satisfied. When such minimum communications constraints are not satisfied, the application may exit background mode and become active. It is to be appreciated that such communications constraints may vary by user, user device, geographic location, time of day, or otherwise. For another embodiment, the ad hoc net app may be initiated when emergency conditions are indicated, such as by a user seeking to dial a "911" or similar emergency services number or otherwise.

Per Operation 402, the process may include the first user device outputting an "available" signal. For at least one embodiment, the available signal may be broadcast on one or more communications frequencies and/or using one or more communications topologies. For example, the available signal may be sent on a BLUETOOTH channel, a WIFI channel, a 3G/4G/5G channel, on a dedicated radio frequency channel, or otherwise.

Per Operation 404, the process may include awaiting receipt of a "response" to the "available" signal from one or more second user devices. For at least one embodiment, a "response" may include an indication by a second user device, which may also be configured to use and is actively using an ad hoc net app, that the second user device is available and interested in joining an ad hoc internal net with the first user device. When a "response" is received by the first user device, the process may proceed to Operation 412. When a "response" is not received within a predetermined time period, where the predetermined time period may be specific to the first user device, standardized, or otherwise determined, the process may proceed to Operation 406.

Per Operation 406, the process may include use of a count-down or similar timer to specify a period during which one or more "available" signals are communicated using one or more communications channels, frequencies, technologies, or the like (collectively, "channels"). It is to be appreciated that the first user device may be configured to send an "available" signal on different channels for different time periods, at different transmission powers, and otherwise.

Likewise, it is to be appreciated that the first user device may be configured to use nearer/short range channels first and then longer range channels later, for example, to minimize power use. Similarly, for an emergency need or under other conditions, the first user device may be configured to use longer range channels first, for example, based on the assumption that a greater number of second user devices will receive and respond to the "available" signal.

Accordingly, per Operation 406, a "time-out" condition being satisfied may be pre-set, may vary by channel, may vary by geography/location, time of day, by user device or otherwise. Further, when a time-out condition is not met (e.g., time not expired), the process may continue with Operation 402-404, as appropriate for a given user device, channel, or otherwise. When a time-out condition is met (e.g., time expired, battery life of the first user device falling below a given threshold, or other condition being satisfied) the process may proceed to Operation 408.

Per Operation 408, the process may include seeking an input from a user of the first user device as to whether the application and/or sending of an "available" signal and awaiting of one or more "responses" is to end.

It is to be appreciated that for at least one embodiment, a user may override one or more pre-set conditions specifying a time-out threshold. Such an override may be desirable, for example and not by limitation, when a user believes a friend or colleague's user device is within range, but, has not yet activated their ad hoc net app on their user device. If the application is not to be stopped, the process may continue with Operations 402-404. If the application is to be stopped, the process may continue with Operation 410. It is to be appreciated that, for at least one embodiment, the ad hoc net app may be configured such that a positive response by a user is required to stop the app. Such a condition may be desirable, for example, when the ad hoc net app was triggered due to an emergency or alert condition. For other embodiments, the ad hoc net app may be configured such that a lack of a positive response results in a termination of the app within a given time period.

Per Operation 410, the process may end. At which instance and for at least one embodiment, the first user device may be automatically reset to await conditions triggering Operation 400.

Per Operation 412, the process may include, for at least one embodiment, a determination of whether additional "responses" are to be received. That is, the ad hoc net app may be configured to await "responses" by the first user device sent by additional second user devices before taking further action. The app may be configured, for at least one embodiment, to await responses from a given number of second user devices before proceeding to Operation 414. For another embodiment, the app may be configured to await response from one or more specific/identified second user devices before proceeding to Operation 414. For at least one embodiment, such specific/identified second user devices may be identified using the user circle engine 106.

Per Operation 414, after a given and/or desired number of "response" have been received, the process may include, for at least one embodiment, a determination by the first user device of whether an internal net has already been formed by two or more of the responding second user devices (herein, a "sub-internal net"). If a sub-internal net has already been formed, the process may proceed, for at least one embodiment, to Operation 416. If a sub-internal net is not already formed, the process may proceed to Operation 418.

Per Operation 416, the process may include a determination may be made by the first user device and/or by a second user device as to whether the sub-internal net is adequate for the intended uses of the first user device and/or one or more of the second user devices. For example, an already formed sub-internal net may not be adequate for communication of certain forms of data, such as 4K video data.

It is to be appreciated that the adequacy or lack thereof of an already formed sub-internal net may vary over time, based upon type of data to be communicated at a given time, and otherwise. Accordingly, it is to be appreciated that Operation 414 may be repeated, as desired, during use of the ad hoc net app by any of the user devices communicatively coupled using the internal net. When the existing sub-internal net is inadequate, at any time, and for any purpose, the process may include Operation 418. When the existing sub-internal net is adequate, at a given time and for a given purpose, the sub-internal net may be designated as the internal net to be used to communicate data between one or more USDs, UIDs and/or UHDs. The process may proceed to Operation 420.

Per Operation 418, the process may include forming an internal net and/or reforming an existing sub-internal net to provide an internal net, at any given time, that furthers a given communicative purpose, such as the sending of text, audio, graphic, visual, video, 4K video, virtual reality, augmented reality, biometric, or other forms of communications signals.

In accordance with at least one embodiment, the internal net may be formed and/or sub-internal net reformed on a dynamic and/or ad hoc basis to seek to satisfy a given, then arising, communicative purpose. As discussed above with respect to FIGS. 2 and 3, such dynamism may involve the selection of different communication paths between USDs, UID, and UHDs. Such communication paths may vary over time and with intended use. When an internal net is formed or a sub-internal net is reformed, as the case may be, the resulting internal net may be used to communicate data between one or more USDs, UIDs, and/or UHDs. The process may proceed to Operation 420.

Per Operation 420, the process may include determining whether an existing, sub-external net has been formed. As discussed above, at least one embodiment of the present disclosure may be configured for use in a dense area only and without providing communications to WCs 150 and/or UDDs 140.

For other embodiments, a system may be formed that facilitates both internal net communications, such as those arising between two or more USDs, UIDs, and UHDs, as well as external net communications, such as those arising via use of links between one or more UHDs and one or more WCs and UDDs. Accordingly and per Operation 420, a determination of whether an existing sub-external net has been formed may be performed by the first user device and/or one or more of the second user devices.

Per Operation 422, the process may include a determination may be made by the first user device and/or by a second user device as to whether the sub-external net is adequate for the intended uses of the first user device and/or one or more of the second user devices. If the sub-external net is adequate, the sub-external net may be designated as the external net to be used to communicate data between one or more USDs on the internal net with one or more UDDs. The process may proceed to Operation 426. If the sub-external net is inadequate, the process may proceed to Operation 424.

Per Operation 424, the process may include forming the external net and/or reforming a sub-external net into an acceptable external net, at any given time, where an acceptable external net furthers the communicative purpose then arising for the internal net formed/reformed per operation 418.

It is to be appreciated that the internal net may be used to determine any required minimum communication constraints of the external net. It is to be appreciated, however, that a given UHD and an external net coupled thereto may be configured to support multiple internal nets. Thus, for at least one embodiment, minimum requirements for a given internal net may or may not be sufficient to satisfy minimum requirements for an external net providing links between one or more WCs and/or UDDs and one or more other user devices connected to one or more internal nets. As discussed above with respect to FIGS. 2 and 3, such dynamism may involve the selection of different communication paths between UHDs, WCs and UDDs, as the case may be. Such communication paths may vary over time and with intended use. When an external net is formed or a sub-external net is reformed, as the case may be, the resulting external net may be used to communicate data between one or more USDs on the internal net with one or more UDDs on the external net. The process may also proceed to Operation 426.

Per Operation 426, the process may include determining whether any new/additional user devices desire to join either an internal net or an existing net. Such process may include one or more ad hoc net apps listening for new "available" signals.

For at least one embodiment, each USD, UID and UHD on a given internal net may be configured to listen for new "available" signals.

For another embodiment, any desired single user device, combination of user devices, type of user devices or permutations of user devices on a given internal may be configured to listen for "available" signals. When a new user device is detected, the process may proceed with Operation 416, as discussed above. When a new user device is not detected, the process may proceed with Operation 428.

Per Operation 428, may include seeking an input from a user of the first user device as to whether the application is to end. It is to be appreciated that each user device may end participation in an internal net at any given time and for any or no reasons. If use of the ad hoc net app is not to end, the process may continue with Operation 416. If use of the ad hoc net app is to end, the process may continue with Operation 410.

It is to be appreciated that the process flow shown in FIG. 4 and discussed above is for illustrative purposes only and is not to be considered limiting an embodiment of the present disclosure or an implementation thereof to any specific sequence of operations.

Further, it is to be appreciated that various elements of a user device, including but not limited to the security module 114, geo-position module 118, and other modules may be used continually and/or at various operations.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system, for facilitating ad hoc communications in dense areas, comprising:
a first user source device (USD) communicatively coupled to an internal net;
a first user destination device (UDD) communicatively coupled to an external net;
a user hub device (UHD), coupled to each of the internal net and the external, configured to facilitate connectivity between the first USD and the first UDD via the internal net and the external net;
wherein the internal net uses a common use communications technology;
wherein the internal net is formed in a dense area;
wherein the internal net is formed on an ad hoc basis;
wherein the external net uses a public wireless system provider communications system located external to the dense area; and
wherein the first USD comprises a hardware processor configured to execute non-transient computer instructions for use in forming the internal net by:
broadcasting an available signal;
awaiting receipt of a first response to the available signal;
determining whether a sub-internal net exists;
forming the internal net when the sub-internal net does not exist;
determining whether a sub-external net exists; and
instructing the UHD to form the external net when the sub-external net does not exist.

2. The system of claim 1,
wherein the dense area is an event area.

3. The system of claim 2,
wherein the event area is one of a stadium, arena, auditorium, concert venue, and a church.

4. The system of claim 1,
wherein the dense area is a geographic area.

5. The system of claim 1,
wherein the first user device includes a hardware processor configured to execute non-transient computer instructions for a facilitating a user circle engine;
wherein the user circle engine is configured to identify any first relationship information regarding the first USD and the first UHD;
wherein the hardware processor is further configured to form the internal net based upon the first relationship information.

6. The system of claim 1,
wherein the first user device includes a hardware processor configured to execute non-transient computer instructions for facilitating a geo-routing engine;
wherein the geo-routing engine is configured to identify a first link for use in communicatively coupling the first USD with the first UHD; and
wherein the hardware processor is further configured for form the internal net using the first link.

7. The system of claim 6, further comprising:
at least two user intermediary devices (UIDs);
wherein the user circle engine is further configured to provide a second relationship information regarding the first USD and a first of the at least two UIDs, and a third relationship information regarding the first USD and a second of the at least two UIDs;
wherein the geo-routing engine is further configured to identify a second link for use in communicatively coupling the first USD with the first of the at least two UIDs;
wherein the geo-routing engine is further configured to identify a third link for use in communicatively coupling the first USD with the second of the at least two UIDs;
wherein the hardware processor is configured to form the internal net based upon one of the first relationship information and a combination of the second relationship information with the third relationship information; and
wherein the hardware processor is configured to form the internal net using one of the first link and a combination of the second link and the third link; and
wherein the hardware processor is configured to form the internal net in view of at least one communications constraint.

8. The system of claim 7,
wherein the at least one communications constraint is a minimum bandwidth requirement.

9. A process, for facilitating ad hoc communications in a dense area, comprising:
forming a first internal net, in a dense area, on an ad hoc basis, and using a common use communications technology, between a user source device (USD) and a user hub device (UID) by;
broadcasting by the USD an available signal;
awaiting receipt of a response signal from at least two responding user devices, including a first user intermediary device (UID) and the UHD;
determining, upon receiving the response signal, whether an adequate sub-internal net exists between the at least two responding user devices; and
forming, the first internal net using a first link between the USD and the first UID with the adequate sub-internal net when the determination results in an affirmative determination; and
forming an external net between the UHD and a user destination device (UDD)
using a public wireless system provider communications system component located external to the dense area.

10. The process of claim 9,
wherein the dense area is one of an event area and a geographic area; and
wherein the event area further comprises one of a stadium, an arena, an auditorium, a concert venue, and a church.

11. The process of claim 9, further comprising:
determining whether an adequate sub-external net exists between the UHD and the UDD;
when the adequate sub-external net does not exist, separately forming the external net;
when the adequate sub-external net exists, using the sub-external net as the external net; and
forming a communications net between the USD and the UDD by combining the internal net with the external net.

12. The process of claim 11,
wherein the determinations of whether an adequate sub-internal net and an adequate sub-external net exist are made in view of at least one communications constraint.

13. The process of claim 12,
wherein the at least one communications constraint is a bandwidth requirement.

14. The process of claim 13, further comprising:
wherein when the at least two responding devices further comprise a second UID;
facilitating a user circle engine on the USD configured to:
identify first relationship information regarding the USD and the first UID;
identify second relationship information regarding the USD and the second UID; and
based upon the first relationship information and the second relationship information, forming the internal net using one of the first UID and the second UID.

15. A non-transitory machine-readable storage medium having stored thereon computer instructions which, when executed by a processor of an electronic device, cause the processor to:
form a first internal net, in a dense area, on an ad hoc basis, and using a common use communications technology, between a user source device (USD) and a user hub device (UHD) by:
broadcasting by the USD an available signal;
awaiting receipt of a response signal from at least two responding user devices, including a first user intermediary device (UID) and the UHD;
determining, upon receiving the response signal, whether an adequate sub-internal net exists between the at least two responding user devices; and
forming, the first internal net using a first link between the USD and the first UID with the adequate sub-internal net when the determination results in an affirmative determination.

16. The non-transitory machine-readable storage medium of claim 15,
wherein the dense area is one of an event area and a geographic area; and
wherein the event area further comprises one of a stadium, an arena, an auditorium, a concert venue, and a church.

17. The non-transitory machine-readable storage medium of claim 15,
wherein the computer instructions, when executed, further cause the processor to:
form an external net between the UHD and a user destination device (UDD) using a public wireless system provider communications system component located external to the dense area.

18. The non-transitory machine-readable storage medium of claim 17,
wherein the computer instructions, when executed, further cause the processor to:
determine whether an adequate sub-external net exists between the UHD and the UDD;
use the sub-external net as the external net when the adequate sub-external net exists;
form the external net when the adequate sub-external net does not exist; and
form a communications net between the USD and the UDD by combining the internal net with the external net.

19. The non-transitory machine-readable storage medium of claim 18,
wherein the determinations of whether an adequate sub-internal net and an adequate sub-external net exist are made in view of at least one communications constraint.

20. The non-transitory machine-readable storage medium of claim 19,
wherein the at least one communications constraint is a bandwidth requirement.

* * * * *